United States Patent [19]
Hensley et al.

[11] 3,950,454
[45] Apr. 13, 1976

[54] POLYMERIZATES OF OLEFINIC NITRILES AND DIENE RUBBERS

[75] Inventors: Linda W. Hensley, Bainbridge Township, Geauga County; George S. Li, Aurora; Gerald P. Coffey, Cleveland Heights, all of Ohio

[73] Assignee: Standard Oil Company, Cleveland, Ohio

[22] Filed: Dec. 9, 1974

[21] Appl. No.: 531,185

[52] U.S. Cl. .............................. 260/879; 260/880 R
[51] Int. Cl.² ........................................... C08L 9/02
[58] Field of Search ......................... 260/879, 880 R

[56] References Cited
UNITED STATES PATENTS

| | | | |
|---|---|---|---|
| 3,426,102 | 2/1969 | Solak | 260/879 |
| 3,586,737 | 6/1971 | Duke | 260/879 |
| 3,775,518 | 11/1973 | Endo | 260/880 R |
| 3,846,509 | 11/1974 | Saluti | 260/879 |

OTHER PUBLICATIONS
Nozaki, J. Polymer Science, Vol. 1, No. 6, 1946, pp. 455–460.

*Primary Examiner*—Paul R. Michl
*Attorney, Agent, or Firm*—John F. Jones; Sherman J. Kemmer

[57] ABSTRACT

Polymeric compositions having good impact resistance, low permeability to gases, and high-softening temperatures which are composed of a conjugated diene monomer, such as butadiene, an olefinically unsaturated nitrile, such as acrylonitrile, an ester of an olefinically unsaturated acid, such as methyl acrylate, and indene are described.

10 Claims, No Drawings

POLYMERIZATES OF OLEFINIC NITRILES AND DIENE RUBBERS

The present invention relates to novel polymeric compositions which have good impact resistance, low permeability to gases, and high-softening temperatures, and more particularly pertains to high-softening, impact-resistant compositions of low-creep characteristics which function as gas and vapor barrier materials and are composed of the essential components of a conjugated diene monomer, an olefinically unsaturated nitrile, an ester of an olefinically unsaturated carboxylic acid, and idene, and to a process for preparing them.

The novel polymeric products of the present invention are prepared by polymerizing a major portion of an olefinically unsaturated nitrile, such as acrylonitrile, and a minor portion of an ester of an olefinically unsaturated carboxylic acid, such as methyl acrylate, and indene, in the presence of a preformed rubbery polymer composed of a conjugated diene monomer, such as butadiene. The present invention is an improvement over the inventions disclosed in U.S. Pat. Nos. 3,426,102 and 3,586,737.

The conjugated diene monomers useful in the present invention include butadiene-1,3, isoprene, chloroprene, bromoprene, cyanoprene, 2,3-dimethyl-butadiene-1,3, and the like. Most preferred for the purpose of this invention are butadiene and isoprene because of their ready availability and their excellent copolymerization properties.

The olefinically unsaturated nitriles useful in this invention are the alpha, beta-olefinically unsaturated mononitriles having the structure

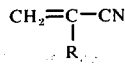

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitrile in the present invention is acrylonitrile.

The esters of olefinically unsaturated carboxylic acids useful in this invention are preferably the lower alkyl esters of alpha, beta-olefinically unsaturated carboxylic acids, and more preferred are the esters having the structure

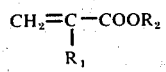

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alphachloroacrylate, ethyl alpha-chloroacrylate, and the like. Most preferred are methyl and ethyl acrylates and methacrylates.

Indene (1-H-idene) and coumarone (2,3-benzofuran) and mixtues are useful as monomers in the present invention. Most preferred is indene.

The polymeric compositions of the present invention can be prepared by any of the known general techniques of polymerization, including the bulk polymerization, solution polymerization, and emulsion or suspension polymerization techniques by batch, continuous or intermittent addition of the monomers and other components. The preferred method is emulsion polymerization. The polymerization is preferably carried out in an aqueous medium in the presence of an emulsifier and a free-radical generating polymerization initiator at a temperature of from about 0° to 100°C in the substantial absence of molecular oxygen.

The rubbery polymers in the present invention are homopolymers of the conjugated diene monomers mentioned above as well as copolymers of these dienes and another monomer component such as acrylonitrile, styrene, ethyl acrylate, and mixtures thereof, wherein there is present at least 50% by weight of the total monomers of the conjugated diene monomer.

The preferred polymeric compositions embodied herein are those resulting from the polymerization of 100 parts by weight of (A) about 60 to 90% by weight of at least one nitrile having the structure

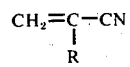

wherein R has the foregoing designation, (B) from 10 to 39% by weight of an ester having the structure

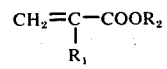

wherein $R_1$ and $R_2$ have the foregoing designations, and (C) from 1 to 15% by weight of at least one member selected from the group consisting of indene and coumarone wherein the given percentages of (A), (B), and (C) are based on the combined weight of (A), (B), and (C), and the amount of (B) always is equal to or greater than the amount of (C), in the presence of from 1 to 40 parts by weight of (D) a rubbery polymer of at least 50% by weight of a conjugated diene monomer selected from the group consisting of butadiene and isoprene and up to 50% by weight of at least one member selected from the group consisting of styrene, acrylonitrile, and ethyl acrylate.

More specifically, the present invention can be illustrated in the polymerization of a mixture of acrylonitrile, methyl acrylate, and indene in the presence of a preformed copolymer of butadiene-1,3 and acrylonitrile to produce a product having excellent impact strength, exceptionally good impermeability to gases and vapors, and improved ASTM heat-distortion temperature. Preferably, the acrylonitrile-methyl acrylate-indene monomer component should contain 70 to 90% by weight of acrylonitrile, 10 to 29% by weight of methyl acrylate, and 1 to 10% by weight of indene.

The preferred rubbery copolymer of butadiene-1,3 and acrylonitrile preferably contains more than 50% by weight of combined butadiene based on the total weight of combined butadiene and acrylonitrile. More preferably, the rubbery copolymer of butadiene and acrylonitrile should contain from 50 to 90%, and most preferably 60 to 80%, by weight of polymerized butadiene.

In the foregoing polymerization, it is preferred that from about 1 to 40, and more preferably 1 to 20, parts of the rubbery diene polymer be employed for each 100 parts of combined acrylonitrile, methyl acrylate, and indene. It has generally been found that as the relative amount of the rubbery diene polymer is increased in the final polymeric product, the impact strength increases and the gas and vapor barrier properties decrease somewhat. It is generally preferred to use just enough of the rubbery diene polymer to impart the desired impact strength to the polymeric product and to retain the optimum gas and vapor barrier properties in the polymeric product.

The novel polymeric products of the present invention are readily processed thermoplastic materials which can be thermoformed into a wide variety of useful articles in any of the conventional ways employed with known thermoplastic polymeric materials, such as by extrusion, milling, molding, drawing, blowing, etc. The polymeric products of this invention have excellent solvent resistance, and their impact strength and low permeability to gases and vapors make them useful in the packaging industry, and they are particularly useful in the manufacture of bottles, film, and other types of containers for liquids and solids.

In the following illustrative examples, the amounts of ingredients are expressed in parts by weight unless otherwise indicated.

EXAMPLE 1

A. A nitrile rubber latex was prepared using the following ingredients and procedure:

| Ingredient | Parts |
|---|---|
| butadiene | 70 |
| acrylonitrile | 30 |
| soap flakes | 1.4 |
| water | 200 |
| Daxad 11* | 0.1 |
| Versene Fe-3** | 0.05 |
| t-dodecyl mercaptan | 0.65 |
| azobisisobutyronitrile | 0.4 |

*Sodium polyalkyl naphthalene sulfonate sold by Dewey and Almy Chemical Company.
**Sodium salt of diethanol-glycine sold by Dow Chemical Company.

The batch emulsion polymerization was carried out in a stainless-steel reactor at 122°F (50°C) to > 90% conversion, and the resulting latex was stripped of volatiles under vacuum at 90°F (33°C) for 2 hours.

A portion of the rubber latex was used for the following emulsion polymerization:

| Ingredient | Parts |
|---|---|
| acrylonitrile | 75 |
| methyl acrylate | 20 |
| indene | 5 |
| 70/30 butadiene/acrylonitrile rubber (emulsion, solids basis) | 9 |
| sodium dioctylsulfosuccinate | 0.85 |
| poly(vinylpyrrolidone)*** | 0.3 |
| water | 230 |
| n-dodecyl mercaptan | 0.1 |
| potassium persulfate | 0.06 |

***GAF K-90 sold by General Aniline and Film Corporation.

The polymerization was carried out with constant agitation in an atmosphere substantially free of molecular oxygen for 16 hours at 60°C. The resulting latex was filtered through cheesecloth to remove prefloc, then the polymer was recovered by coagulation in a hot aluminum-sulfate solution, water washed, and dried in a vacuum oven. Transparent bars and films were compression molded from the powder for physical testing. Properties are summarized in Table 1.

B. The recipe and procedure of Example 1A were followed except that the monomer ratio was 75/25 (acrylonitrile/methyl acrylate). Properties of this polymer which is outside the scope of this invention are also summarized in Table 1 wherein "AN" signifies "acrylonitrile", "MA" signifies "methyl acrylate", "IN" signifies "indene", "HDT" signifies "ASTM heat-distortion temperature", "WVTR" signifies "water vapor transmission", and "OTR" signifies "oxygen transmission".

Table 1

| Monomer Ratio | | | HDT (264 psi) °C | Izod Impact Strength ft lbs/inch of notch | Flexural Strength psi | Flexural Modulus psi × $10^{-5}$ | WVTR (g-mil) 100 $in^2$/24 hrs/atm | OTR (cc-mil) 100 $in^2$/24 hrs/atm |
|---|---|---|---|---|---|---|---|---|
| AN | MA | IN | | | | | | |
| 75 | 20 | 5 | 74 | 14.9 | 15,000 | 4.03 | 5.5 | 0.4 |
| 75 | 25 | | 69 | 10.2 | 16,100 | 4.50 | 6.6 | 1.7 |

EXAMPLE 2

The rubber latex described in Example 1A was also used in the emulsion polymerization of a series of materials of increasing indene content prepared according to the following recipe:

| Ingredient | Parts |
|---|---|
| acrylonitrile | 75 |
| methyl acrylate | 25–15 |
| indene | 0–10 |
| 70/30 butadiene/acrylonitrile rubber | 9 |
| GAFAC RE-610**** } pH→6 | 3 |
| water | 235 |
| n-dodecyl mercaptan | 0.1 |
| potassium persulfate | 0.2 |

****A mixture of R—O($CH_2CH_2O$—)$_n PO_3M_2$ and [R—O($CH_2CH_2O$—)$_n$]$_2PO_2M$ wherein n is a number of from 1–40, R is an alkyl or alkaryl group and preferably a nonyl phenyl group, and M is hydrogen, ammonia or an alkali metal, which composition is sold by the General Aniline and Film Corporation.

The procedure followed was that described in Example 1A except that the polymerization was run for 8 hours. Properties are summarized in Table 2. In the polymers described above, the ones made with indene in the monomer charge all had lower water vapor transmission and oxygen transmission rates than the one made without indene in the monomer charge.

The polymer described in Table 2, which was made from 75 parts acrylonitrile and 25 parts methyl acrylate, was found to have a WVTR of 6.9, whereas polymers in this table made from 75 parts acrylonitrile, 20 parts methyl acrylate, and 5 parts indene, and 75 parts acrylonitrile, 15 parts methyl acrylate, and 10 parts indene were found to have WVTR's of 5.6 and 4.3, respectively.

Table 2

| Monomer Ratio | | | HDT (264 psi) °C |
|---|---|---|---|
| AN | MA | IN | |
| 75 | 25 | | 71 |
| 75 | 24 | 1 | 71 |
| 75 | 23 | 2 | 72 |
| 75 | 22 | 3 | 71 |
| 75 | 21 | 4 | 73 |
| 75 | 20 | 5 | 74 |
| 75 | 19 | 6 | 72 |
| 75 | 18 | 7 | 74 |
| 75 | 17 | 8 | 76 |
| 75 | 16 | 9 | 80 |
| 75 | 15 | 10 | 79 |

EXAMPLE 3

A. The recipe and procedure of Example 2 were followed except that a different mercaptan was used. The monomer ratio and mercaptan were as follows: 75/20/5/1.3 (acrylonitrile/methyl acrylate/indene/limonene dimercaptan). Properties are summarized in Table 3.

B. The recipe and procedure of Example 3A were followed except that the monomer ratio was 75/25 (acrylonitrile/methyl acrylate). Properties of this polymer which is outside the scope of the present invention are summarized in Table 3.

In this case, resin A above was found to have much lower water vapor transmission and oxygen transmission rates than resin B.

Table 3

| Monomer Ratio | | | % Yield From Emulsion | HDT (264 psi) °C | WVTR (g-mil) 100 in$^2$/24 hrs/atm |
|---|---|---|---|---|---|
| AN | MA | IN | | | |
| 75 | 20 | 5 | 97 | 73 | 6.8 |
| 75 | 25 | | 90 | 68 | 8.7 |

EXAMPLE 4

The rubber latex described in Example 1A was also used in the emulsion polymerization of a series of materials of increasing indene content prepared according to the following recipe:

| Ingredient | Parts |
|---|---|
| acrylonitrile | 80 |
| methyl acrylate | 20–10 |
| indene | 0–20 |
| 70/30 butadiene/acrylonitrile rubber (solids basis) | 9 |
| GAFAC RE-610 | 3 |
| water | 235 |
| limonene dimercaptan | 1.3 |
| potassium persulfate | 0.2 |

The procedure followed was that described in Example 1A except that the polymerization was run for 8 hours. Properties are summarized in Table 4. In this example, the polymers made from a monomer mixture containing indene were found to have much lower water vapor transmission and oxygen transmission rates than the polymer made from the monomer mixture containing no indene.

The first and last polymers listed in Table 4 were found to have WVTR's of 5.1 and 3.7, respectively.

Table 4

| Monomer Ratio | | | HDT (264 psi) °C |
|---|---|---|---|
| AN | MA | IN | |
| 80 | 20 | | 70 |
| 80 | 18 | 2 | 72 |
| 80 | 16 | 4 | 72 |
| 80 | 14 | 6 | 75 |
| 80 | 13 | 7 | 77 |
| 80 | 12 | 8 | 78 |
| 80 | 11 | 9 | 80 |
| 80 | 10 | 10 | 81 |

EXAMPLE 5

A. The recipe and procedure of Example 2 were followed. The monomer ratio was 80/15/5 (acrylonitrile/methyl acrylate/indene). Properties are summarized in Table 5.

B. The recipe and procedure of Example 5A were followed except that the monomer ratio was 80/20 (acrylonitrile/methyl acrylate). Properties of this resin which is outside the scope of this invention are summarized in Table 5.

Polymer A was also found to have an Izod impact strength of 1.04 foot pounds per inch of notch, an oxygen transmission rate of 0.84, and a $CO_2$ transmission rate of 1.35 cc-mil/atmosphere/100 inches$^2$/day.

Table 5

| Monomer Ratio | | | % Yield From Emulsion | HDT (264 psi) °C |
|---|---|---|---|---|
| AN | MA | IN | | |
| 80 | 15 | 5 | 94 | 82 |
| 80 | 20 | | 97 | 75 |

EXAMPLE 6

An emulsion polymerizaton was run in a 1-liter, four-necked glass resin kettle using the following ingredients and procedure:

| Ingredient | Parts |
|---|---|
| acrylonitrile | 70 |
| methyl acrylate | 15 |
| indene (added in three equal portions at 0, 29, and 58% conversion) | 15 |
| 70/30 butadiene/acrylonitrile rubber | 12 |
| GAFAC RE-610 } pH → 6 | 3 |
| water | 230 |
| limonene dimercaptan (added continuously to 22% conversion) | 0.5 |
| potassium persulfate | 0.1 |
| potassium persulfate (added in three equal portions at 29, 58, and 67% conversion) | 0.15 |

The resin kettle was equipped with a stirrer, thermometer, addition funnel, and nitrogen lines. The jacketed flask was heated by circulating water. The reaction was carried out for 10 hours at 60° to 63°C, and the resulting latex was filtered through cheesecloth. Polymer was recovered by coagulation in a hot aluminum-sulfate solution, washed with water, and dried in a vacuum oven. Bars and films were compression molded from the powder for physical testing. Properties are summarized in Table 6.

Table 6

| | Monomer Ratio | | |
|---|---|---|---|
| | AN | MA | IN |
| | 70 | 15 | 15 |
| HDT (264 psi) | 82°C | | |
| Izod Impact Strength | 1.7 foot pounds per inch of notch | | |
| Flexural Strength | 11,800 psi | | |
| Flexural Modulus | $3.16 \times 10^5$ psi | | |
| Rockwell Hardness (M Scale) | 47 | | |
| WVTR (g-mil) 100 in²/24 hrs/atm | 5.4 | | |
| OTR (cc-mil) 100 in²/24 hrs/atm | 2.1 | | |
| Brabender Plasticorder Torque | 1490 meter grams | | |

EXAMPLE 7

A series of emulsion polymers was prepared according to the following recipe:

| Ingredient | Parts |
|---|---|
| acrylonitrile | 70–60 |
| methyl acrylate | 15–25 |
| indene | 15 |
| 70/30 butadiene/acrylonitrile rubber | 12 |
| GAFAC RE-610 } pH → 6 | 3 |
| water | 230 |
| n-dodecyl mercaptan | 0.1 |
| potassium persulfate | 0.2 |

The procedure followed was that described in Example 1A. Properties are summarized in Table 7. All of the polymers listed in Table 7 were found to have excellent WVTR and OTR rates.

Table 7

| Monomer Ratio | | | % Yield From Emulsion | Prefloc | % AN in Polymer | HDT (264 psi) °C | Izod Impact Strength ft lbs/inch of notch |
|---|---|---|---|---|---|---|---|
| AN | MA | IN | | | | | |
| 70 | 15 | 15 | 66 | ~0 | 59 | 84 | 7.6 |
| 65 | 20 | 15 | 44 | ~0 | 50 | 82 | 8.4 |
| 60 | 25 | 15 | 40 | ~0 | 46 | 79 | 11.1 |

EXAMPLE 8

The rubber latex described in Example 2A was also used in the emulsion polymerization according to the following recipe:

| Ingredient | Parts |
|---|---|
| acrylonitrile | 75 |
| methyl acrylate | 20 |
| indene | 5 |
| 70/30 butadiene/acrylonitrile rubber | 9 |
| GAFAC RE-610 | 1.5 |
| water | 230 |
| limonene dimercaptan | 0.8 |
| potassium persulfate | 0.09 |

The polymerization was carried out by charging acrylonitrile-methyl acrylate-indene-rubber latices and 0.3 part of limonene dimercaptan into a reactor prefilled with the emulsifier and water. After being purged thoroughly with nitrogen, the reaction was heated with stirring to 60°C and initiated with 0.06 part of potassium persulfate. At 3.5 hours after initiation, an additional 0.03 part of potassium persulfate, 0.3 part of limonene dimercaptan, and at 5 hours after initiation, an additional 0.2 part of limonene dimercaptan were charged into the reactor. The polymerization was stopped at 6 hours after initiation and the product was coagulated with hot (70° to 75°C) aluminum-sulfate (2 parts) solution, washed with hot water, and dried in a vacuum oven. The yield was 80%. This resin gave the following properties:

| | |
|---|---|
| heat-distortion temperature (264 psi) | 76°C |
| flexural strength | $15.8 \times 10^3$ psi |
| flexural modulus | $4.87 \times 10^5$ psi |
| Izod impact | 1.20 ~ 2.31 foot pounds per inch of notch |
| Brabender torque (230°C, 35 rpm, 50-gram sample) | 1450–1550 meter grams |

This polymer was found to have excellent (low) WVTR and OTR rates and was clear and colorless when molded.

EXAMPLE 9

The rubber latex described in Example 1A was also used in the emulsion polymerization according to the following recipe:

| Ingredient | Parts |
|---|---|
| acrylonitrile | 75 |
| methyl acrylate | 15 |
| indene | 10 |
| 70/30 butadiene/acrylonitrile rubber | 9 |
| GAFAC RE-610 } pH → 6 | 2.25 |
| water | 225 |
| limonene dimercaptan | 0.6 |
| potassium persulfate | 0.15 |

The polymerization was carreid out by charging acrylonitrile, methyl acrylate, 5 parts of indene, and 0.3 part of limonene dimercaptan into a reactor filled with the emulsifier and water. After being thoroughly purged with nitrogen, the reactor was heated with stirring to 60°C and initiated with 0.06 part of potassium persulfate. At 4.5 hours after initiation, an additional 5 parts of indene, 0.04 part of potassium persulfate, 0.3 part of limonene dimercaptan, and at 6 hours after initiation, an additional 0.05 part of potassium persulfate were charged into the reactor. The polymerization was stopped at 7 hours after initiation and the product was coagulated with hot (75° to 80°C) aluminum-sulfate (2 parts) solution, washed with hot water, and dried in a vacuum oven. The yield was 88%. This resin was found to give the following properties:

| | |
|---|---|
| heat-distortion temperature (264 psi) | 81–83°C |
| flexural strength | $14.9 - 15.4 \times 10^3$ psi |

| | |
|---|---|
| flexural modulus | 3.86 – 4.01 × 10⁵ psi |
| Izod impact | 1.10 – 1.30 foot pounds per inch notch |
| Brabender torque (230°C, 35 rpm, 50-gram sample) | 1400–1450 meter grams |

This resin was found to have excellent WVTR and OTR rates.

EXAMPLE 10

The rubber latex described in Example 2A was also used in the emulsion polymerization according to the following recipe:

| Ingredient | Parts |
|---|---|
| acrylonitrile | 75 |
| methyl acrylate | 10 |
| indene | 15 |
| 70/30 butadiene/acrylonitrile rubber | 12 |
| GAFAC RE-610 } pH → 6 | 2.25 |
| water | 225 |
| limonene dimercaptan | 0.5 |
| potassium persulfate | 0.18 |

The polymerization was carried out by charging 40 parts of acrylonitrile, 10 parts of methyl acrylate, and 0.05 part of limonene dimercaptan into a reactor filled with the emulsifier and water. After being purged thoroughly with nitrogen, the reactor was heated with stirring to 60°C and initiated with 0.06 part of potassium persulfate. After 30 minutes, a comonomer feed consisting of 35 parts of acrylonitrile, 15 parts of indene, and 0.45 part of limonene dimercaptan was pumped into the reactor over a 6-hour period. Additional charges of potassium persulfate were added to the reactor at 3 hours (0.04 part), 5 hours (0.05 part), and 6.5 hours (0.03 part) after initiation.

The polymerization was stopped at 9 hours after initiation and the product was coagulated with hot (80° to 90°C) aluminum-sulfate (2 parts) solution, washed with hot water, and dried in a vacuum oven. The yield was 81.5%. This resin was found to give the following properties:

| | |
|---|---|
| heat-distortion temperature (264 psi) | 87°C |
| flexural strength | 14.2 × 10³ psi |
| flexural modulus | 3.85 × 10⁵ psi |
| Izod impact | 0.61 – 0.87 foot pounds per inch of notch |
| Brabender torque (230°C, 35 rpm, 50-gram sample) | 1250–1300 meter grams |

This resin was found to be an excellent barrier against gases and vapors.

We claim:

1. The polymeric composition resulting from the polymerization of 100 parts by weight of
   A. from about 60 to 90% by weight of at least one nitrile having the structure

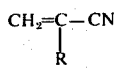

wherein R is hydrogen, a lower alkyl group having from 1 to 4 carbon atoms, or a halogen,
   B. from about 10 to 39% by weight of an ester having the structure

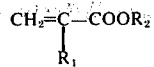

wherein $R_1$ is hydrogen, an alkyl group having from 1 to 4 carbon atoms, or a halogen, and $R_2$ is an alkyl group having from 1 to 6 carbon atoms, and
   C. from about 1 to 15% by weight of at least one member selected from the group consisting of indene and coumarone
   wherein the given percentages of (A), (B), and (C) are based on the combined weight of (A), (B), and (C), and the amount of (B) is always equal to or greater than the amount of (C), in the presence of 1 to 40 parts by weight of
   D. a rubbery polymer of at least 50% by weight of a conjugated diene monomer selected from the group consisting of butadiene and isoprene and up to 50% by weight of at least one member selected from the group consisting of styrene, acrylonitrile, and ethyl acrylate.

2. The composition of claim 1 wherein the nitrile is acrylonitrile.
3. The composition of claim 2 wherein the ester is methyl acrylate.
4. The composition of claim 3 wherein (C) is indene.
5. The composition of claim 4 wherein (D) is a copolymer of butadiene and acrylonitrile.
6. The process comprising polymerizing in an aqueous emulsion in the presence of a free-radical initiator and in the substantial absence of molecular oxygen 100 parts by weight of
   A. from about 60 to 90% by weight of at least one nitrile having the structure

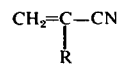

wherein R is hydrogen, a lower alkyl group having from 1 to 4 carbon atoms, or a halogen,
   B. from about 10 to 39% by weight of an ester having the structure

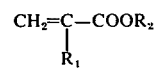

wherein $R_1$ is hydrogen, an alkyl group having from 1 to 4 carbon atoms, or a halogen, and $R_2$ is an alkyl group having from 1 to 6 carbon atoms, and
   C. from about 1 to 15% by weight of at least one member selected from the group consisting of indene and coumarone
   wherein the given percentages of (A), (B), and (C) are based on the combined weight of (A), (B), and (C), and the amount of (B) is always equal to or greater than the amount of (C), in the presence of 1 to 40 parts by weight of
   D. a rubbery polymer of at least 50% by weight of a conjugated diene monomer selected from the group consisting of butadiene and isoprene and up to 50% by weight of at least one member selected from the group consisting of styrene, acrylonitrile, and ethyl acrylate, and recovering the polymeric resin product.

7. The process of claim 6 wherein the nitrile is acrylonitrile.

8. The process of claim 7 wherein the ester is methyl acrylate.

9. The process of claim 8 wherein (C) is indene.

10. The process of claim 9 wherein (D) is a copolymer of butadiene and acrylonitrile.